United States Patent [19]

Childs et al.

[11] 4,313,496

[45] Feb. 2, 1982

[54] WELLHEAD SHEARING APPARATUS

[75] Inventors: Eric G. Childs, Katy; Friedrich E. Just, Houston, both of Tex.

[73] Assignee: Cameron Iron Works, Inc., Houston, Tex.

[21] Appl. No.: 142,689

[22] Filed: Apr. 22, 1980

[51] Int. Cl.$^3$ .......................................... E21B 29/08
[52] U.S. Cl. .................................................... 166/55
[58] Field of Search .................. 166/55, 55.1; 83/639; 251/1 A

[56] References Cited

U.S. PATENT DOCUMENTS

| | | | |
|---|---|---|---|
| 1,802,565 | 4/1931 | Lacey | 166/55 |
| 3,399,728 | 9/1968 | Taylor | 166/55 |
| 3,561,526 | 2/1971 | Williams, Jr. | 166/55 |
| 3,736,982 | 6/1973 | Vujasinovic | 166/55 |
| 3,817,326 | 6/1974 | Meynier | 166/55 |
| 3,946,806 | 3/1976 | Meynier | 166/55 |
| 4,043,389 | 8/1977 | Cobb | 166/55 |
| 4,132,265 | 1/1979 | Williams, Jr. | 166/55 |
| 4,132,266 | 1/1979 | Randall | 166/55 |
| 4,132,267 | 1/1979 | Jones | 166/55 |
| 4,240,503 | 12/1980 | Holt, Jr. et al. | 166/55 |

Primary Examiner—James A. Leppink
Attorney, Agent, or Firm—Vinson & Elkins

[57] ABSTRACT

A shearing apparatus for installation on a wellhead and having capability of shearing drill collars. The improved apparatus includes a body with a vertical bore therethrough and ram guideways extending laterally from opposite sides of the bore, a pair of rams, each positioned in one of the guideways, each ram including a cutting blade, reciprocating means secured to each ram for moving the rams and their cutting blades into the vertical bore to shear tubular members therein and to retract the rams and cutting blades into the guideways, the reciprocating means having sufficient power to cause the cutting blades to shear large diameter casing and drill collars, and arms secured to the sides of the rams and extending toward the other ram, said arms engaging as the rams are moved toward the bore and providing a force resisting the forces tending to vertically separate the cutting blades during shearing, said arms also substantially filling the space of the guideways outside the vertical bore to prevent the forcing of members being sheared into this space.

8 Claims, 5 Drawing Figures

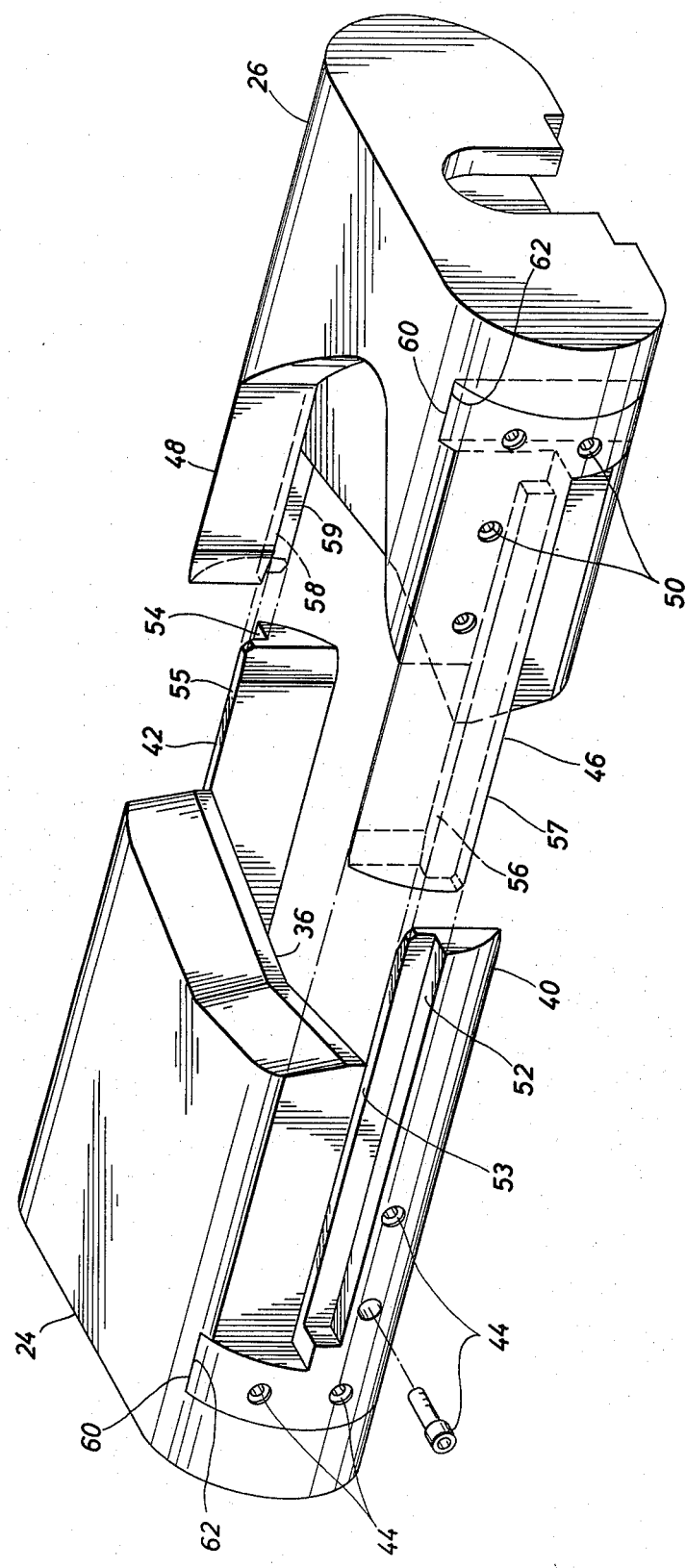

4,313,496

WELLHEAD SHEARING APPARATUS

BACKGROUND

The present invention relates to a shearing apparatus for shearing objects, such as a drill string, extending through a wellhead. The drill string may include a kelly joint, drill pipe, tool joints and drill collars of various weights per foot.

During the drilling of a well it may be necessary to shear the drill string at the wellhead to control the well. It is therefore desirable to be able to shear whatever portion of the drill string may be positioned in the wellhead when an emergency condition arises requiring shearing of the string and sealing of the well.

Prior shearing devices, such as shown in U.S. Pat. No. 3,561,526, were in the form of blowout preventers which cut through drill pipe and provided a seal against the well pressure after the well pipe had been sheared. While these shearing devices have functioned satisfactorily in shearing drill string pipe, they have not been designed to shear drill collars or heavy casing for several reasons. Usually they do not have sufficient power for shearing the heavy drill collars. They tend to flatten a casing so that it is wider than the preventer bore and hangs in the guideways. Also, in exerting the force necessary to shear a drill collar, the cutting blades have a tendency to separate vertically which reduces their shearing ability.

Some prior shearing devices provided guides to prevent separation of the blades. U.S. Pat. No. 1,802,564 discloses a wellhead shearing apparatus having slots in the body surrounding the well bore, the blades sliding within such slots in their shearing action. A side support for cutter blades is provided by the device disclosed in U.S. Pat. No. 3,399,728.

SUMMARY

The improved shearing apparatus of the present invention is used to shear any portion of a drill string in a wellhead. It includes a body with a bore therethrough and with ram guideways extending laterally from opposite sides of the bore, a ram assembly including first and second rams, each located in one of the ram guideways, a cutting blade in each ram, means associated with the blades to retain the structure being sheared within the bore and to resist separation of the blades during shearing, and means for moving the rams into and out of the bore with sufficient power for the cutting blades to shear drill collars.

An object of the present invention is to provide an improved wellhead shearing apparatus capable of shearing any part of a drill string.

A further object is to provide a wellhead shearing apparatus which prevents the structure being sheared from becoming stuck by engaging the guideways of the apparatus.

Still another object is to provide an improved wellhead shearing apparatus having a force which resists spreading of the cutting blades, thus resulting in greater shearing efficiency.

BRIEF DESCRIPTION OF THE DRAWINGS

These and other objects and advantages of the present invention are hereinafter set forth and explained with reference to the drawings wherein:

FIG. 4 is an isometric view of the preferred form of blades and rams of the present invention.

DESCRIPTION OF THE PREFERRED EMBODIMENTS

Figure 1:
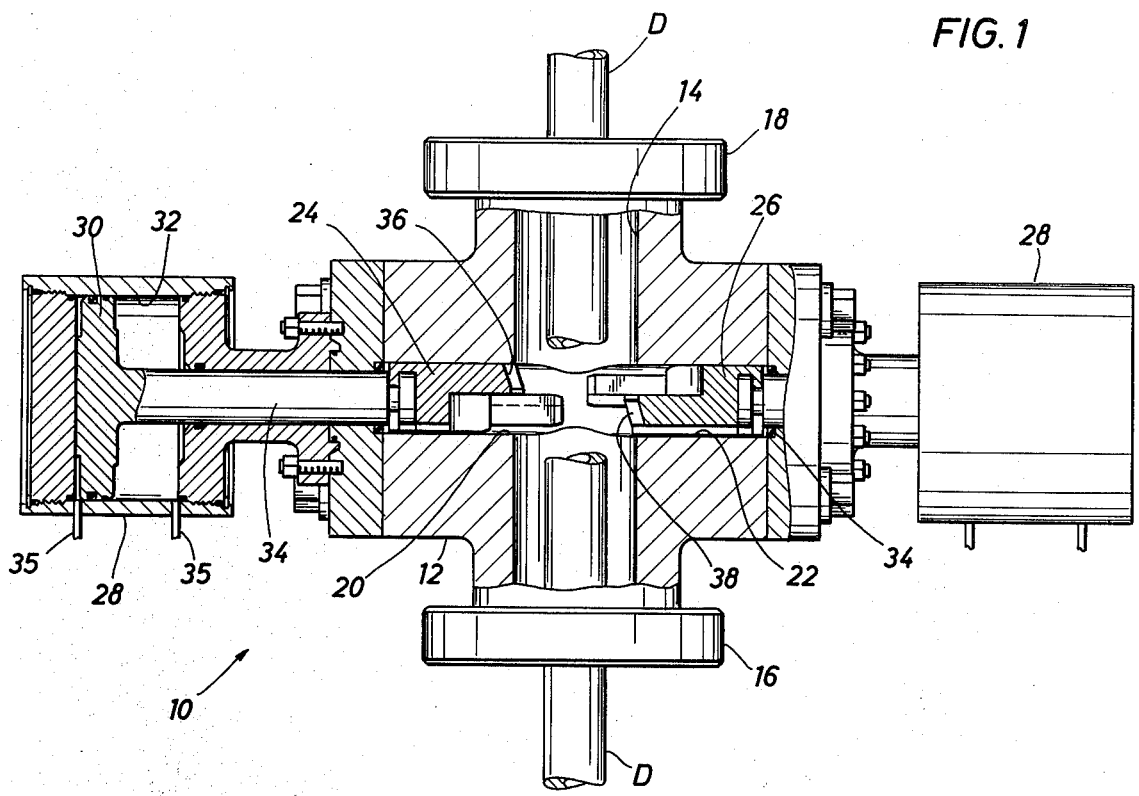
FIG. 1 is an elevation view, partly in section, of the improved shearing apparatus of the present invention with a drill collar extending therethrough and a portion of the drill collar broken away to show details of the ram assembly.
Figure 2:
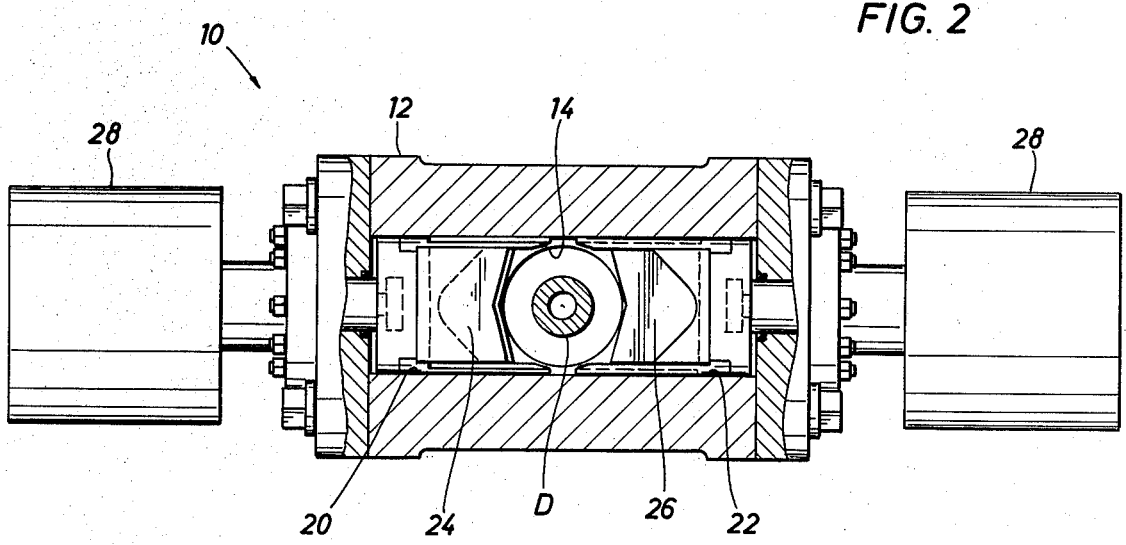
FIG. 2 is a plan view of the apparatus of FIG. 1 with portions of the body broken away to illustrate the relationship of the arms, the bore and the guideway.

Referring particularly to FIGS. 1 and 2, apparatus 10 includes body 12 with vertical bore 14 extending therethrough. Drill string D passes through bore 14. Body 12 has lower flange 16 and upper flange 18 so that apparatus 10 may be connected in a wellhead stack. Ram guideways 20 and 22 extend outwardly from opposite sides of bore 14. The ram assembly of apparatus 10 includes first and second rams 24 and 26 which are positioned in guideways 20 and 22, respectively.

Reciprocating means, such as actuators 28, are provided to move or extend the rams in response to fluid pressure into bore 14 for shearing the portion of the drill string D which extends through the bore and for retracting the rams from the bore. Actuators 28 each include piston 30 in cylinder 32 and rod 34 connecting between the piston and the ram which it is to move and are suitably connected to body 12 as shown. Suitable means are provided to deliver fluid under pressure to opposite sides of piston 30.

Upper cutting blade 36 is on ram 24 and lower cutting blade 38 is on ram 26. As shown in FIG. 4 the cutting blades are integral with the rams.

Rams 24 and 26 are generally oval-shaped in cross section, conforming to the shape of guideways 20 and 22 and cutter blades 36 and 38 face bore 14. Cutting blades 36 and 38 are positioned so that the cutting edge of blade 38 passes just below the cutting edge of blade 36 in shearing of a section of drill string. Arms 40 and 42 are secured to the sides of ram 24 by cap screws 44, as shown, and extend toward bore 14. Arms 46 and 48 are secured to the sides of ram 26 by cap screws 50 and extend toward bore 14.

Figure 5:
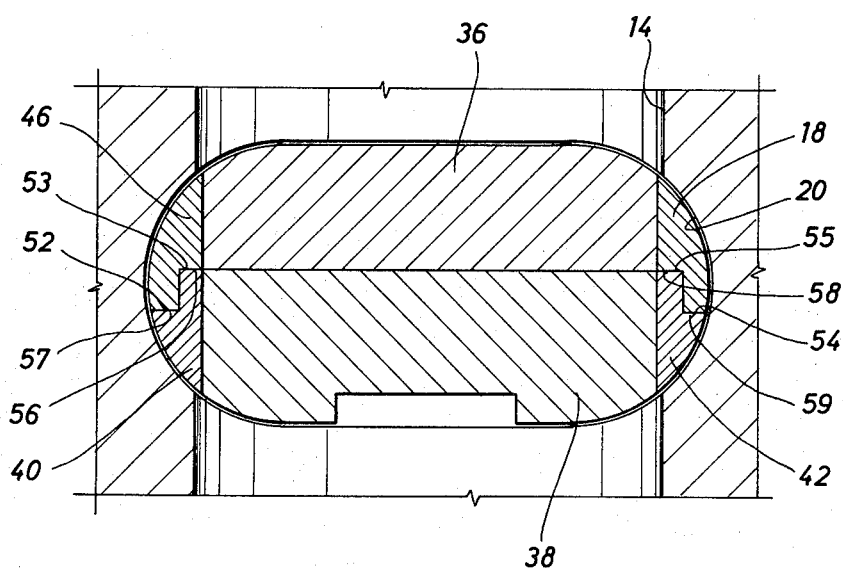
FIG. 5 is a sectional view taken along line 5—5 in FIG. 3.

Arms 40, 42, 46 and 48 extend forward from their rams at the sides of the blades and are sufficiently thick to overlap bore 14 a small distance as best seen in FIG. 5. Arms 40 and 42 also have upwardly facing shoulders 52 and 54, and top surfaces 53 and 55, respectively, extending along a substantial portion of their length as shown in FIG. 4. Arms 46 and 48 have downwardly facing shoulders 56 and 58 and lower surfaces 57 and 59, respectively, extending along a substantial portion of their length as shown in FIG. 4. Each of arms 40, 42, 46 and 48 is provided with a vertical inward projection 60 fitting into the grooves 62 in the rams.

When rams 24 and 26 are moved inward, arm 40 engages arm 46 with shoulder 52 engaging surface 57 and shoulder 56 engaging surface 53. Also, arms 42 and 48 engage with shoulder 54 engaging surface 59 and shoulder 58 engaging surface 55. All of these engagements are sliding engagements. When rams 24 and 26 are moved sufficiently to engage drill string D, their arms are interengaged and occupy the spaces in the guideways 20 and 22 at the sides of bore 14 as best seen in FIG. 5. Thus, as drill string D is being sheared by the shearing action of cutting blades 36 and 38, these arms prevent the drill string from being flattened into the spaces in guideways 20 and 22 at the sides of bore 14.

The shearing action of cutting blades 36 and 38 generates forces tending to force upper blade 36 upward and lower blade 38 downward. Movement of the blades responsive to these forces away from the shearing plane would greatly reduce their efficiency in shearing. In shearing apparatus 10 these forces are resisted and the blades are maintained substantially in their most efficient shearing position by the interengagement of the arms. Shoulders 56 and 58 and surfaces 57 and 59 tend to move down as cutting blade 38 is forced in the downward direction and shoulders 52 and 54 and surfaces 53 and 55 tend to move up as cutting blade 38 is forced in the upward direction. The engagement of the shoulders and surfaces transmits these forces to hold these blades in desired alignment. Also, the tight fit of the arms in the sides of the guideways provides a force resisting the forces tending to separate the cutting blades.

While the rams shown and described have an integral cutting blade, it should be understood that a separate cutting blade could be suitably secured to the ram body such as with cap screws and interengaging projection and slot.

Figure 3:
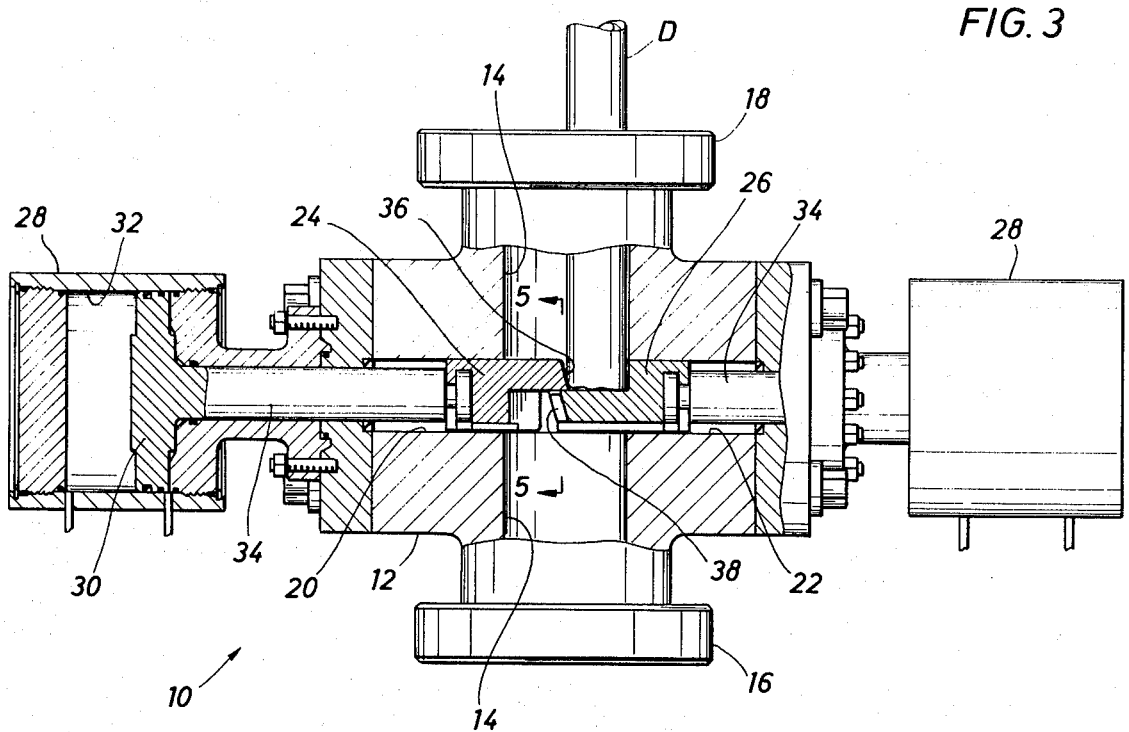
FIG. 3 is a view similar to FIG. 1 illustrating the shearing of a drill collar.

Shearing apparatus 10 illustrated in FIG. 3 has just completed the shearing of the drill string D and the lower portion thereof has dropped into the well bore (not shown) below apparatus 10. This illustrates shearing of a drill collar which is not believed to be substantially flattened by the shearing. Large diameter casing and drill pipe would normally be flattened as commonly shown in prior patents.

To shear drill collars and heavy wall casing, actuators 28 are substantially more powerful than the actuators used with well pipe shearing devices of the prior art. For example, actuators 28 are proposed to operate at the same pressure as prior shearing devices but have an effective pressure responsive area of approximately four times that of prior actuators for similar sized shear rams. A comparison can be made to the effective pressure area of actuators which in a prior art device was 133 square inches while the actuator 28 of the present invention has an effective pressure area of 616 square inches. Thus, actuator 28 develops more than four times the force of prior shearing devices and has sufficient power and strength to quickly shear such 7-inch drill collars and 13-⅜ inch casing. In order to shear 8-inch drill collars, it is recommended that the fluid pressure supplied to actuators 28 be increased from the usual 3,000 psi to 5,000 psi.

In shearing such large diameter casing, the arms prevent movement of the collapsed casing into the guideways at the side of the bore and also resist separating of the cutting blades during shearing.

What is claimed is:

1. A ram-type shearing apparatus for a wellhead comprising
   a body having a bore therethrough and ram guideways extending laterally from opposite sides of the bore,
   a ram assembly comprising first and second rams, each located in one of the ram guideways, and means for reciprocating the rams into and from the bore,
   each ram having a cutting blade in position for the cutting edge of the blade on one ram to pass just below the cutting edge of the blade on the other to shear an object positioned in the bore when the rams are moved together into the bore, and
   each ram having an arm secured to its side and extending toward the other ram,
   one such arm overlapping its opposite arm to prevent vertical separation of the blades.

2. A shearing apparatus according to claim 1 wherein said moving means has sufficient power to cause said blades to shear through a full size drill collar in the bore.

3. A shearing apparatus according to claim 1 wherein said cutting blades are integral with said rams.

4. A shearing apparatus according to claim 1 wherein said arms fit tightly against the side of the guideways and are sufficiently thick to overlie a small portion of the bore when said rams have been moved at least partly into the bore.

5. A shearing apparatus according to claim 2 wherein said arms fit sufficiently tightly against the sides, top and bottom of said guideways to resist separation of said blades during shearing of an object in the bore.

6. A shearing apparatus according to claim 1 wherein each ram has a pair of such arms secured along its sides extending from the ram toward the other ram to assure that objects being sheared are not forced laterally into said guideways outward from the bore.

7. A shearing apparatus according to claim 2 wherein each of said arms has shoulders extending along their length, the shoulders in the arms extending from the ram with the lower blade facing downward and the shoulders on the arms extending from the ram with the upper blade facing upward, and
   the shoulders of rams interengage as the rams are moved inward to provide a transmission of forces to resist separation of the cutting blades during shearings.

8. A shearing apparatus for a wellhead comprising
   a body having a vertical bore therethrough, first and second ram guideways extending laterally from opposite sides of the bore and means for connecting the body into a wellhead stack, said guideways having a width greater than the diameter of the vertical bore,
   a ram assembly including first and second rams, each ram being located in its respective ram guideway,
   actuating means for extending each ram into and retracting each ram from the vertical bore,
   each ram having a cutting blade, the cutting blades being positioned so that on extension of each ram into the vertical bore one blade passes the other with its cutting edge just below the cutting edge of the other blade to shear an object in the vertical bore, and
   arms secured to the sides of each ram and extending toward the other ram,
   the arms being sufficiently large to fill the guideway space outside the vertical bore during shearing to prevent tubular members being sheared from being forced into the guideway space at the side of the vertical bore,
   each arm having a shoulder engaging a shoulder on the opposite arm of the other ram, the shoulders on the arms of the ram having the upper cutting blade facing upwardly and the shoulders on the arms of the ram having the lower cutting blade facing downwardly to provide forces resisting the forces developed during shearing which tend to separate the cutting blades.

* * * * *

UNITED STATES PATENT AND TRADEMARK OFFICE
CERTIFICATE OF CORRECTION

PATENT NO. : 4,313,496

DATED : February 2, 1982

INVENTOR(S) : Eric G. Childs and Friedrich E. Just

It is certified that error appears in the above-identified patent and that said Letters Patent are hereby corrected as shown below:

Renumber claims 4 and 6 to be claims 6 and 4 respectively.

New claim 6, line 1, delete the numeral "1" and insert therefor the numeral -- 4 --.

Claim 5, line 1, delete the numeral "2" and insert therefor the numeral -- 4 --.

Claim 7, line 1, delete the numeral "2" and insert therefor the numeral -- 4 --.

Signed and Sealed this

Twenty-fifth Day of May 1982

[SEAL]

Attest:

*Attesting Officer*

GERALD J. MOSSINGHOFF

*Commissioner of Patents and Trademarks*